Dec. 24, 1929. K. F. GALLIMORE ET AL 1,740,542
WORKHOLDER
Filed June 23, 1927
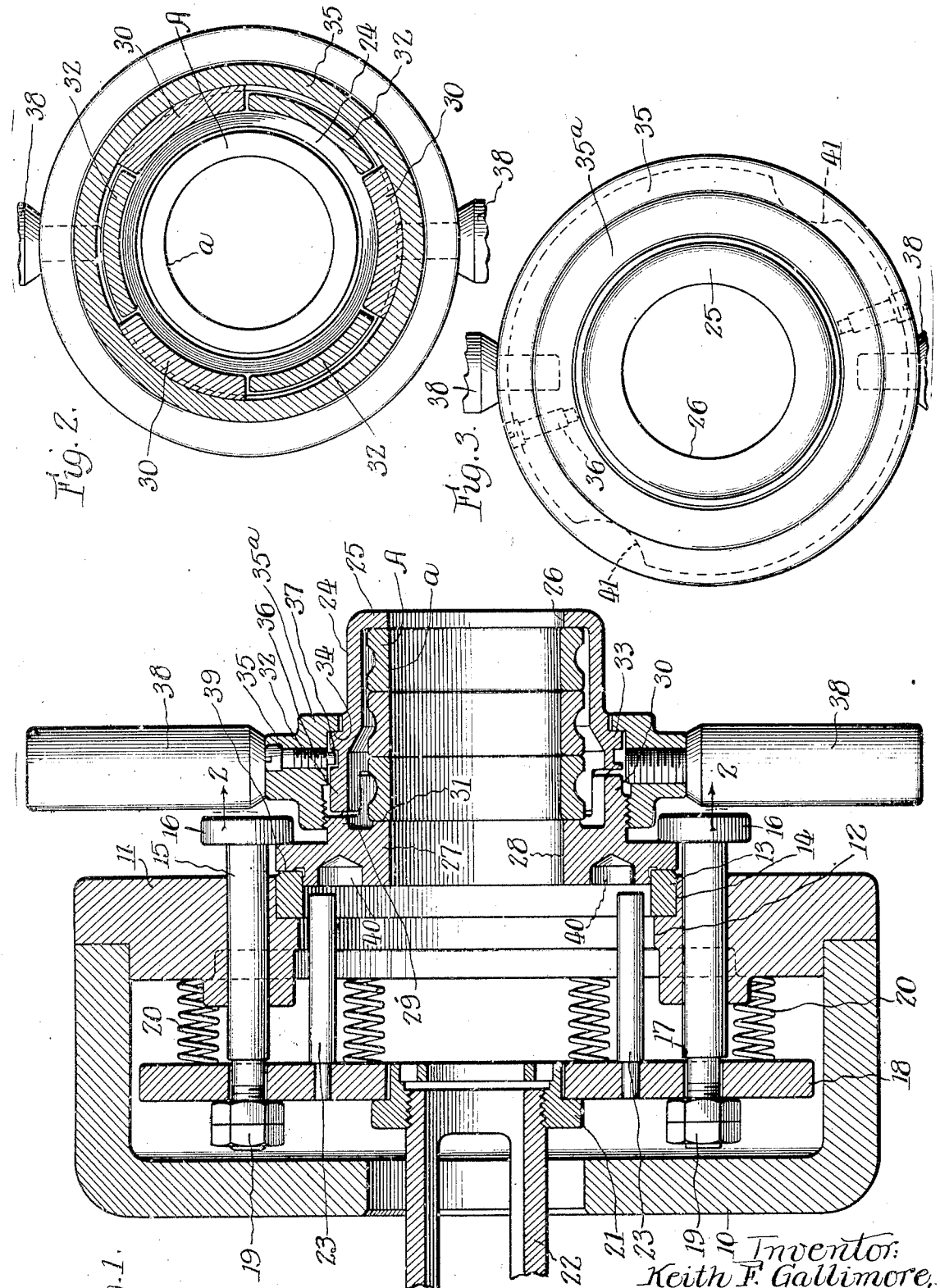

Patented Dec. 24, 1929

1,740,542

UNITED STATES PATENT OFFICE

KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS

WORK HOLDER

Application filed June 23, 1927. Serial No. 200,798.

The present invention relates to improvements in portable workholders, and has particular reference to workholders of the type disclosed in a copending application, Serial No. 680,826, filed December 15, 1923, by Herbert E. Kempton and Keith F. Gallimore. In workholders of that type, one or more work blanks are adapted to be centered and clamped in the workholder while the latter is out of the machine chuck, and the loaded workholder is then adapted to be quickly positioned and clamped in the machine chuck with the work blanks in centered position with reference to the axis of rotation. By using workholders of this type a considerable saving of time is effected since more than one work blank can be chucked at one time and one work holder can be loaded while another is in the chuck, and the workholder can be mounted in the chuck more quickly than a work blank.

The objects of the invention are to provide a novel workholder which is simple and inexpensive in construction, into which the work blanks can be easily and quickly loaded, and in which the work blanks are held securely in centered position.

Further objects and advantages will become apparent as the description proceeds.

In the accompanying drawings, Figure 1 is an axial sectional view of a suitable chuck and of a workholder embodying the features of our invention mounted in said chuck.

Fig. 2 is a sectional view of the workholder taken along line 2—2 of Fig. 1.

Fig. 3 is an outer end view of the workholder.

While the invention is susceptible of various modifications and alternative constructions, we have shown in the drawings and will herein describe in detail the preferred embodiment, but it is to be understood that we do not thereby intend to limit the invention to the particular form disclosed, but intend to cover all modifications and alternative constructions falling within the spirit and scope of the invention as expressed in the appended claims.

Referring to the drawings, 10 represents the body of a suitable chuck which is adapted to be secured to a rotatable spindle (not shown). In the present instance, the body 10 is annular in shape and is closed at its front end with a circular front plate 11. The latter is formed with a central opening 12 concentric with the axis of rotation. A hardened centering ring 13 adapted to position the workholder is rigidly mounted in an annular notch 14 cut in the outer edge of the opening 12. Slidably mounted in the front plate 11 and at diametrically opposed points about the opening 12 are two clamping pins or members 15 having enlarged heads 16 on their outer ends adapted to clamp the workholder against the centering ring 13. The inner ends of the clamping members 15 are reduced in size to provide shoulders 17, and extend through a floating clamping plate 18 to which they are loosely secured by nuts 19. A plurality of coiled springs 20 are interposed between the front plate 11 and the clamping plate 18, and tend to move the latter to the left to clamp the workholder to the ring 13. Centrally mounted in the clamping plate 18 is a bushing 21 to which a push rod 22 is secured. The push rod serves as a means for moving the clamping plate 18 against the force of the springs 20 to move the clamping members 15 outwardly. Two ejector pins 23 mounted on the plate 18 extend forwardly into the ring 13 and are adapted to move the workholder away from the ring when released by the members 15.

The workholder comprises a plate 27 on which one or more work blanks are adapted to be positioned, and a hollow body 24 adapted to fit over the work blanks and to clamp them securely to the plate. In the present instance, three work blanks A having bores $a$ to be ground are shown. These blanks are positioned end to end, and abut against an annular bearing rib 31 formed on the adjacent side of the plate 27 and about a central bore 28 somewhat larger than the bores $a$. Before being clamped against the plate 27, the blanks A are centered relative to the bore 28.

The plate 27 is preferably circular in shape, and is formed in its outer side with an annular notch 39 concentric with the bore 28 and adapted to fit over the inner peripheral edge of the centering ring 13 or other equivalent means to locate the workholder in centered position on the chuck. The plate 27 is adapted to be clamped to the ring 13 by the heads 16 which overlap therewith, and to permit positioning on the chuck is formed in its periphery with two diametrically opposed arcuate notches 41 adapted to be moved into and out of registration with the heads. Two diametrically spaced bores 40 are formed in the outer side of the plate 27, and are adapted to fit over suitable projections (not shown) to hold the plate 27 against rotation while being loaded or unloaded. Formed on the inner side of the plate 27 is an annular flange 29 which is threaded externally, and which is concentric with the rib 31. A plurality of peripherally spaced clutch teeth 30 are formed on the end of the flange 29.

The body 24 is preferably cylindrical in shape, and large enough in internal diameter to clear the sides of the work blanks. Formed on the outer end of the body 24 is an inner peripheral radial flange 25 which serves to clamp the work blanks A against the bearing rib 31, and which defines a central opening 26 somewhat larger than the bores a to permit entry of an operating element (not shown). Peripherally spaced clutch teeth 32 are formed on the inner end of the body 24, and are adapted to interlock with the teeth 30 on the plate 27 to prevent relative rotation of the two parts.

The inner end of the body 24 is formed with an enlarged cylindrical portion 33 defining a circumferential shoulder 34. Rotatably mounted on the enlarged portion 33 is an annular clamp nut 35 one end of which has a radial flange 35ª fitting over the shoulder 34, and the other end of which is threaded over the flange 29 of the plate 27 to clamp the work blanks between the flange 25 and the rib 31. The clamp nut 35 is held against axial movement by a plurality of inwardly extending screws 36, the ends of which engage an annular groove 37 in the periphery of the enlarged portion 33. Two handles 38 are secured to the nut 35 to provide means for adjusting the latter, and for handling the workholder.

In operation, the work blanks are centered on the plate 27. Preferably this is done by means of a loading device of the type disclosed in our copending application Serial No. 69,637, filed November 16, 1925. The body 24 is then positioned over the work blanks, and on the plate 27. The work blanks are now clamped in centered position by turning the nut 35 to move the body 24 toward the plate 27.

To mount the workholder on the chuck, the clamping members 15 are moved outwardly, and the workholder is positioned on the ring 13. The notches 41 are then moved out of registration with the heads 16, and the rod 22 is thereafter released, whereupon the springs 20 act to clamp the workholder securely in centered position.

It will be seen that we have provided a portable workholder which is extremely simple and inexpensive in construction. A large number of work blanks can be mounted in the workholder at one time, and can be easily and quickly centered and clamped. The construction of the body of the workholder is such that no flexure of the clamping parts results.

We claim as our invention:

1. A workholder having, in combination, a plate adapted to have one or more work blanks mounted end to end thereon, a body adapted to fit over said work blanks and against said plate, a radial flange formed on the outer end of said body and adapted to press the work blanks against said plate, intermeshing teeth on said plate and said body adapted to prevent relative rotation therebetween, and a clamping nut loosely rotatable but non-slidable on said body and having threaded engagement with said plate.

2. A workholder having, in combination, a supporting plate for one or more work blanks, centering means provided by said plate, notches in the periphery of said plate to assist in the location of the workholder on a chuck, a cylindrical body adapted to fit over said work blanks, said body having a radial flange on one end for pressing the work blanks against a surface provided by said plate, and a clamping member rotatably mounted on said body and having threaded engagement with said plate for drawing said plate and body together to clamp the work blanks.

3. A workholder having, in combination, a supporting plate for one or more work blanks, a cylindrical body adapted to fit over said work blanks, a radial flange provided by said body to engage the work blanks, a circumferential shoulder provided on the exterior of said cylindrical body, an annular member having one or more handles surrounding said cylindrical body and having a flange adapted to engage for end thrust the aforesaid circumferential shoulder, a groove in the cylindrical body, and means on the annular member fitting in said groove to prevent the annular member and cylindrical body from falling apart while loading the workholder, and screw threads provided by the plate and by the annular member, whereby workpieces may be clamped in the workholder by rotation of the annular member by its handle or handles.

In testimony whereof we have hereunto affixed our signatures.

KEITH F. GALLIMORE.
RAYMOND M. WOYTYCH.